(12) United States Patent
Bruford et al.

(10) Patent No.: US 6,935,671 B2
(45) Date of Patent: Aug. 30, 2005

(54) VEHICLE TAILGATE WITH SUPPLEMENTAL TAILGATE HAVING VERTICAL EXTENSION MODE

(75) Inventors: Stephen Bruford, West Bloomfield, MI (US); Kian-Huat Tan, Westland, MI (US); Herbert Gruber, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 10/970,283

(22) Filed: Oct. 21, 2004

(65) Prior Publication Data

US 2005/0093327 A1 May 5, 2005

Related U.S. Application Data

(60) Provisional application No. 60/515,521, filed on Oct. 29, 2003, provisional application No. 60/515,370, filed on Oct. 29, 2003.

(51) Int. Cl.[7] .............................................. B62D 33/03
(52) U.S. Cl. ......................... 296/57.1; 296/3; 296/26.1
(58) Field of Search .......................... 296/3, 57.1, 26.1, 296/26.08, 26.09, 26.11, 26.02; 224/402, 224/403, 405

(56) References Cited

U.S. PATENT DOCUMENTS

| 4,624,619 | A | 11/1986 | Uher |
| 5,312,149 | A | 5/1994 | Boone |
| 5,468,038 | A | 11/1995 | Sauri |
| 5,478,130 | A | 12/1995 | Matulin et al. |
| 5,700,047 | A | 12/1997 | Leitner et al. |
| 5,788,311 | A | 8/1998 | Tibbals |
| 5,806,907 | A | 9/1998 | Martinus et al. |
| 5,902,000 | A | 5/1999 | Wold |
| 5,988,725 | A | 11/1999 | Cole |
| 6,019,410 | A | 2/2000 | Trostle et al. |
| 6,045,172 | A | 4/2000 | Thomas et al. |
| 6,082,801 | A | * | 7/2000 | Owen et al. .............. 296/26.11 |
| 6,120,076 | A | 9/2000 | Adsit et al. |
| 6,364,392 | B1 | 4/2002 | Meinke |
| 6,425,618 | B1 | 7/2002 | Garland et al. |
| 6,454,338 | B1 | 9/2002 | Glickman et al. |
| 6,550,841 | B1 | * | 4/2003 | Burdon et al. .............. 296/57.1 |
| 6,626,478 | B1 | 9/2003 | Minton |
| 6,676,182 | B2 | 1/2004 | Fitts |
| 6,698,810 | B1 | * | 3/2004 | Lane .............................. 296/3 |
| 2004/0227368 | A1 | * | 11/2004 | Seksaria et al. ........... 296/26.1 |

FOREIGN PATENT DOCUMENTS

DE 2745751 4/1979

* cited by examiner

*Primary Examiner*—Joseph D. Pape
(74) *Attorney, Agent, or Firm*—Gigette M. Bejin

(57) ABSTRACT

A tailgate for a vehicle has a supplemental tailgate that retracts within the tailgate and is extendable therefrom in order to provide different assist functions. The supplemental tailgate may include a pivotable molding, which mounts on a movable frame portion, a latching assembly, and a gravity latch assembly. When pivoted, the pivotable molding releases the latching assembly, allowing the supplemental tailgate to be moved to various extended positions. The gravity latch assembly engages the pivotable molding to prevent the pivotable molding from being pivoted when the tailgate is in the generally vertical closed position, and disengages the pivotable molding to allow for pivoting when the tailgate is in the generally horizontal open position.

21 Claims, 7 Drawing Sheets

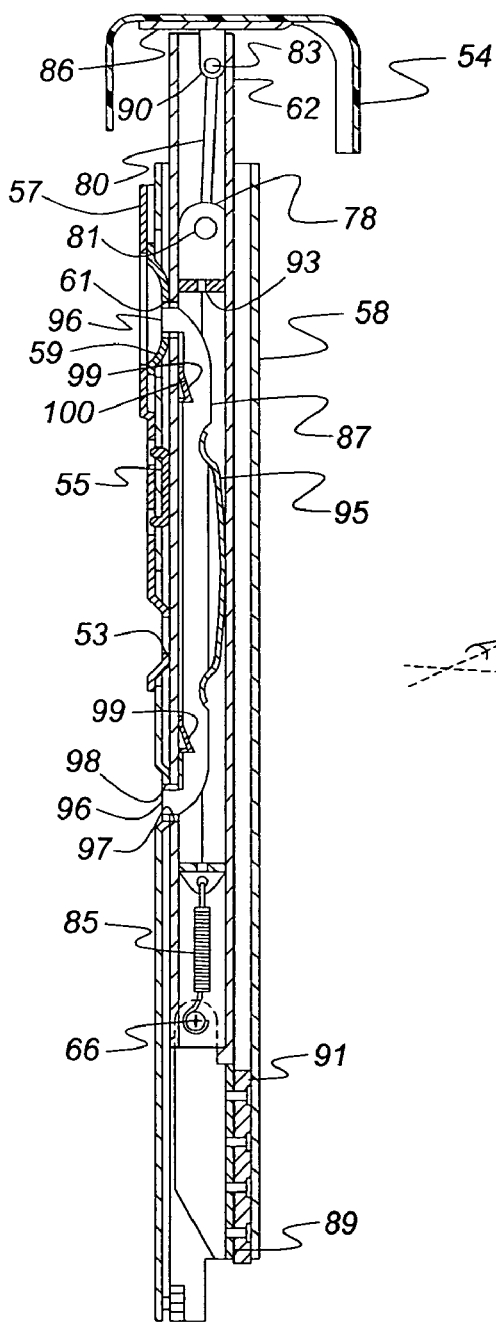
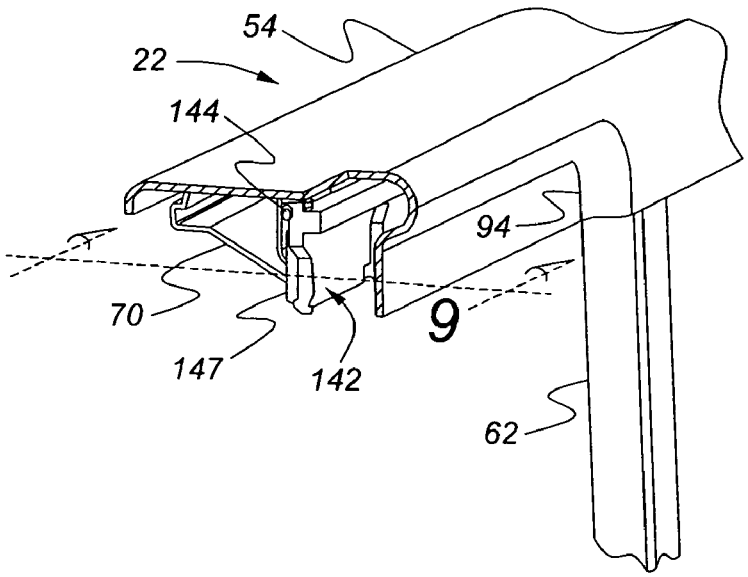
Fig. 7
Fig. 8

VEHICLE TAILGATE WITH SUPPLEMENTAL TAILGATE HAVING VERTICAL EXTENSION MODE

CROSS REFERENCE TO RELATED APPLICATIONS

This application claims the benefit of United States provisional patent applications identified as application Ser. No. 60/515,521, filed Oct. 29, 2003, and application Ser. No. 60/515,370, filed Oct. 29, 2003, and are both incorporated herein by reference.

BACKGROUND OF INVENTION

The present invention relates to vehicle tailgates, and more particularly to vehicle tailgates that include a multi-function assembly extendable therefrom.

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a roof rack type of function (an upwardly extending structure from a closed tailgate that works in conjunction with the vehicle roof to support long loads). Such arrangements are particularly useful for carrying a long ladder, canoe, etc. However, the typical arrangement for supporting such loads involves a fixed framework mounted to and extending above the pickup box, or a movable, but externally mounted support mechanism. Again, though, both of these types of arrangements detract significantly from the attractiveness of the vehicle, and moreover, may interfere with the use of the box for other purposes unless completely removed from the vehicle. Such an additional function can be provided with simple ergonomic operation of the assembly, while still allowing for an attractive appearance for the vehicle when the extender is stowed during periods of non-use.

A drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off. Some bed extender designs interfere with or cause the elimination of this molding, further detracting from the appearance of the vehicle.

Thus, it is desirable to have a vehicle tailgate with a bed extender that overcomes the drawbacks of the prior art.

SUMMARY OF INVENTION

In its embodiments, the present invention contemplates a tailgate assembly for use with a motor vehicle having a pair of spaced, generally vertical side walls and a generally horizontal bed extending therebetween. The tailgate assembly has a tailgate frame defining a generally hollow cavity therein and is adapted to pivotally mount generally between the side walls and be operable between a generally horizontal open position and a generally vertical closed position. The tailgate assembly also includes a supplemental tailgate including a guide system secured generally within the hollow cavity, a movable frame assembly having two telescoping supports extendable from and retained by the guide system, and a cross member connected to the two telescoping supports and extending therebetween. The supplemental tailgate also preferably includes a pivotable latch release lever mounted on and pivotable relative to the cross member, a latch release assembly operatively connected to the pivotable latch release lever and operable to selectively release the two telescoping supports from the guide system, and a gravity latch assembly operatively engaging the pivotable latch release lever to prevent the pivotable latch release lever from being actuated when the tailgate frame is in the generally vertical closed position.

An embodiment of the present invention also contemplates a truck including a box having a pair of spaced generally vertical side walls and a generally horizontal bed extending therebetween, and a cab having a roof enclosing a top portion of the cab. A tailgate has a tailgate frame defining a generally hollow cavity therein and pivotally mounts generally between the side walls and is operable between a generally horizontal open position and a generally vertical closed position. The truck also may include a supplemental tailgate including a guide system secured generally within the hollow cavity, a movable frame assembly having two telescoping supports extendable from and retained by the guide system, a cross member connected to the two telescoping supports and extending therebetween, a latch release lever, a latch release assembly operatively connected to the latch release lever and operable to selectively release the two telescoping supports from the guide system, and a catch assembly operatively engaging the latch release lever to prevent the latch release lever from being actuated when the tailgate frame is in the generally vertical closed position and allow the latch release lever to be actuable when the tailgate frame is in the generally horizontal open position.

An advantage of an embodiment of the present invention is that a portion of the tailgate molding can be employed to operate as a supplemental tailgate release handle, while also preventing the inadvertent release of the supplemental tailgate latching assemblies while a long load is being supported overhead. Moreover, the release assembly is easy and quick to operate, thus making deployment and stowage of the supplemental tailgate simple.

Another advantage of an embodiment of the present invention is that the supplemental tailgate, when in its retracted position during times of nonuse, will not detract from the attractiveness of the vehicle. Moreover, it can closely match the look of tailgates for similar trucks that do not have a supplemental tailgate, thus allowing for essentially the same appearance across that particular line of trucks.

An additional advantage of an embodiment of the present invention is that the highly ergonomic and esthetically pleasing supplemental tailgate assembly still allows for a multi-function bed extender. This supplemental tailgate assembly can be moved to different positions in order to be employed to extend the bed, and to operate as a vertical support.

BRIEF DESCRIPTION OF DRAWINGS

FIG. 7 is a side sectional view of the supplemental tailgate in accordance with the present invention.

FIG. 8 is a perspective, partially sectioned view of the supplemental tailgate, illustrating the engagement of a gravity latch assembly when the supplemental tailgate is in a generally vertical orientation, in accordance with the present invention.

DETAILED DESCRIPTION

Figure 1:
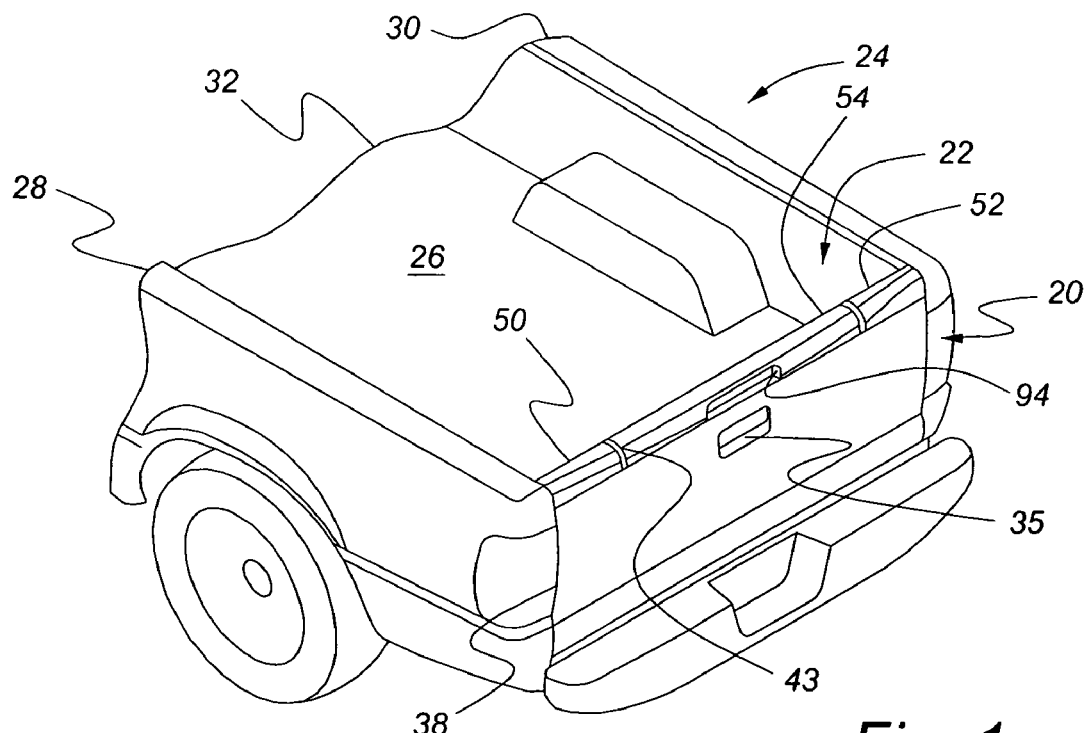
FIG. 1 is a perspective view of a rear portion of a vehicle incorporating a tailgate, with the tailgate shown in a generally vertical, closed position, in accordance with the present invention.

FIGS. 1–12 illustrate a tailgate 20 that mounts to a vehicle 24—preferably a pickup truck. The tailgate 20 includes a supplemental tailgate 22 mounted therein. The vehicle 24 includes a box 26 that is defined by a left rear quarter panel 28, which forms a first vertical surface of the box 26; a right rear quarter panel 30, which forms a second vertical surface of the box 28; a bed 32, which extends between the two panels 28, 30 to form a cargo floor; and the tailgate 20, which is pivotable between a generally vertical closed position and a generally horizontal open position.

The tailgate 20 may include a pair of conventional tailgate hinges 34 that preferably cooperate with the side panels 28, 30, and a pair of tailgate supports 36, which support the tailgate 20 when in its horizontal position. A tailgate handle 35 mounts to an outer panel 38, and functions in a conventional manner. The tailgate release mechanism and handle 35, as well as tailgate latches, are conventional and well known in the art and so are not shown herein. The tailgate 20 is comprised of a tailgate frame 37 including the outer panel 38, which forms the outer finished surface of the tailgate 20, and a tailgate frame inner panel 40, which mounts to the outer panel 38 and forms the inner surface and sides 42 of the tailgate 20. The outer panel 38 and inner panel 40 combine to form a pair of upper surfaces with a gap 43 therebetween. Preferably, tailgate reinforcements (not shown) mount within and provide structural support to the frame outer and inner panels 38, 40. A left tailgate molding 50 and a right tailgate molding 52 mount on top of the upper surfaces of the tailgate frame 37. They may be made of colored plastic that is the desired color of the parts; this eliminates the need to paint them. In this way, the tailgate moldings 50, 52 will help to prevent paint scratches on metal parts when cargo is being loaded over the top of a closed tailgate 20.

The components that make up the tailgate frame 37 are formed so that a hollow internal cavity is created. Within this cavity, the supplemental tailgate 22 is retained. The supplemental tailgate 22 may include a pivotable molding 54 in addition to a movable frame portion 56, and guide rails 58. The guide rails 58 are hollow, and may be generally rectangular tubes that are fixed to the tailgate frame 37 and support the movable frame portion 56 as it is telescopically extended from and retracted into the guide rails 58.

Each guide rail 58 includes pivot brackets 64 mounted on top that cooperate with the movable frame portion 56 to allow for both pivoting of the movable frame portion 56 relative to the tailgate 20 and preventing the movable frame portion 56 from being separated from the guide rails 58. The pivot brackets 64 may be fastened to the tailgate frame 37 and the bottoms of the guide rails 58 to the inner panel 40 in order to help secure the guide rails 58 to the tailgate 20.

Figure 4:
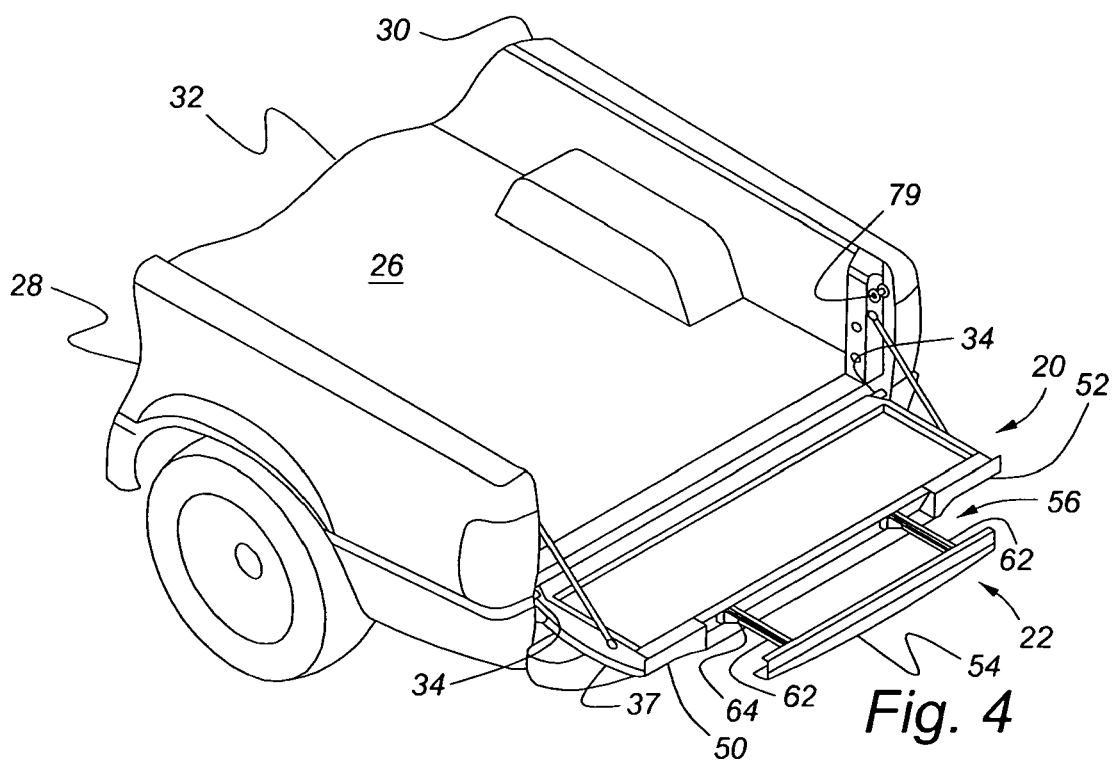
FIG. 4 is a partial perspective view similar to FIG. 3, but with the supplemental tailgate shown in a partially extended position.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or some other suitable means. Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position, (as best seen in FIG. 4).

Each of the movable frame portion's support tubes 62 are hollow so they can receive a respective one of the two latching assemblies 60 therein. More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which are part of the pivotable molding 54, in order to form a release hinge 84.

Even though, for some features of the supplemental tailgate 22, only the feature on the left or right side is shown, the supplemental tailgate 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The lower ends of the latch housings 78 connect to respective latch return springs 85, which, in turn, are each connected to its corresponding hinge pin 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the support tubes 62 relative to the guide rails.

Each of the latch housings 78 also includes a longitudinally extending central slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the supplemental tailgate 22 is in its stowed position. Each latch housing 78 also includes internal flanges 99, located within the slot 93, that engage with release ramps 100 on the latch blade 87.

The movable frame portion 56 also includes a cross member assembly 68 that connects to the tops of the support tubes 62. The cross member assembly 68 includes various main supports with brackets attached thereto in order to form a support frame 70. Specifically, pivot mounts 73 extend from the support frame 70, for attaching the pivotable molding 54, discussed below. The cross member assembly 68 may include a pair of hollow tubes 72 that can be employed to stow lock rod assemblies (not shown) for supporting the supplemental tailgate 22 in a box extender type of position, if so desired.

The support frame 70 may be formed strong enough to support the weight of one or more people standing on it. This way, if the movable frame portion 56 is extended out and pivoted downward toward the ground, the support frame 70 can be used as a step, if so desired.

The pivot mounts 73 connect to and mount the pivotable molding 54 about a pivot axis 77. The pivotable molding 54 may be formed from plastic, or other suitable material, such as, for example, a thirty percent glass filled polypropylene. The release levers 82 may be molded into the pivotable molding 54 while it is being formed or affixed thereto after forming by, for example, friction welding. Each release lever 82 includes a base 86 that is adjacent to the pivotable molding 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. As the latch actuation rods 80 pull up, the latching assemblies 60 unlatch, allowing the support tubes 62 to slide relative to the guide rails 58. When the pivotable molding is then released, the latch actuation rods 80 are pulled back down due to the bias of the springs 85, thus re-engaging the latching assemblies 60.

Since, for certain uses for which the supplemental tailgate 22 may be employed, it is desirable to prevent an operator from inadvertently unlatching the latching assemblies 60, a gravity latch assembly 142 is desired. The gravity latch assembly 142 includes a catch plate 147, which is fixed to the support frame 70 and extends generally parallel to the support tubes 62. A pivot pin 144 is mounted to the support frame 70, with the gravity latch assembly 142 having a lateral arm 146 and a longitudinal arm 148 extending therefrom. The center of gravity 143 of these arms 146, 148 is offset from a pivot axis of the pivot pin 144. The longitudinal arm 148 also includes a catch 149 that extends adjacent to a side of the catch plate 147. The functioning of the gravity latch assembly 142 will be discussed below relative to the operation of the supplemental tailgate 22.

The pivotable molding 54 may be molded with the plastic being the desired final color so that it does not have to be painted. The pivotable molding 54 may also include a handle pocket 94 that is molded into the rear surface of the pivotable molding 54. The handle pocket 94 provides for ease of gripping and pivoting the pivotable molding 54 when deploying the supplemental tailgate 22. The pivotable molding 54 may also have an overall width that is just smaller than the gap 43 formed between the two tailgate moldings 50, 52, and has a top surface that is flush with the top surfaces of the two tailgate moldings 50, 52. Additionally, if so desired, the two tailgate moldings 50, 52 may include recessed flanges (not shown) that nest under the edges of the pivotable molding 54. Accordingly, the supplemental tailgate 22, when in its fully retracted position, will blend-in with the tailgate 20, having an appearance that is very similar to a tailgate that does not include a supplemental tailgate. Thus, the supplemental tailgate 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns.

Figure 2:
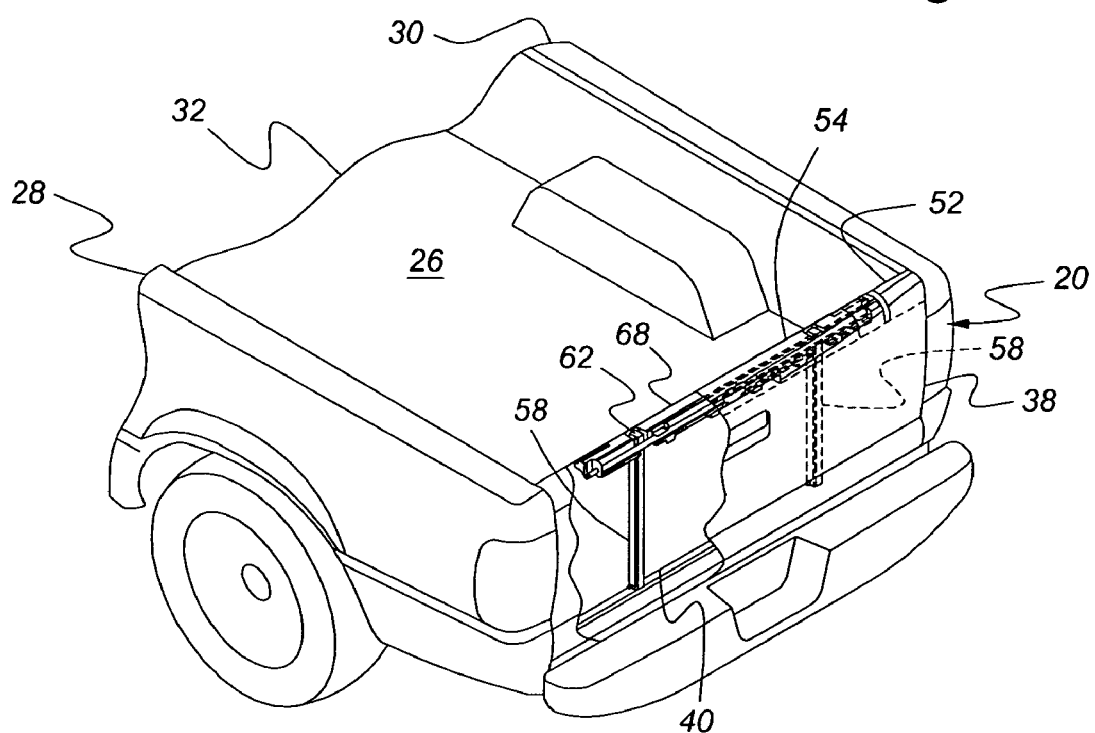
FIG. 2 is a partially cutaway perspective view similar to FIG. 1, with the cutaway area revealing the supplemental tailgate structure retracted into its stowed position within the vehicle tailgate.

The operation of the supplemental tailgate 22 will now be described. The supplemental tailgate 22 may be easily released from its stowed position within the tailgate 20 while the tailgate 20 is in its generally horizontal, open position. While the tailgate 20 is in its generally vertical, closed position, the supplemental tailgate 22 generally cannot be released from its stowed position. For example, when the tailgate 20 is in its generally vertical, closed position, and the supplemental tailgate is stowed, as best illustrated in FIGS. 1 and 2, the gravity latch assembly 142 will be in the position illustrated in FIGS. 8 and 9. Specifically, the location of the center of gravity 143 of the gravity latch assembly 142 relative to the pivot pin 144 will cause the longitudinal arm 148 to rotate back against the catch plate 147, thereby causing the catch 149 to extend adjacent to the edge of the catch plate 147. In this position, if one were to grab the handle pocket 94 of the pivotable molding 54 and attempt to pivot it about its pivot axis 77, the catch 149 will engage the catch plate 147, thereby preventing such pivoting motion. Without this pivoting, the latching assemblies 60 will not unlatch.

Figure 3:
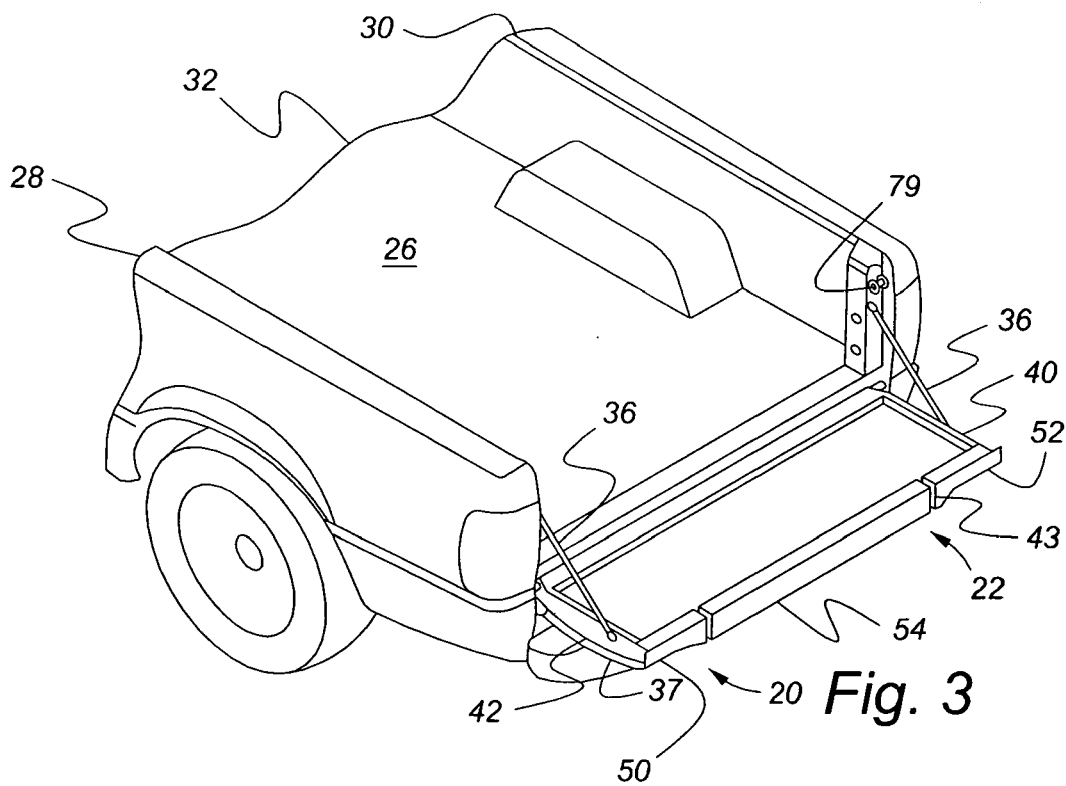
FIG. 3 is a partial perspective view similar to FIG. 1, but with the tailgate shown in its open, generally horizontal position.
Figure 10:
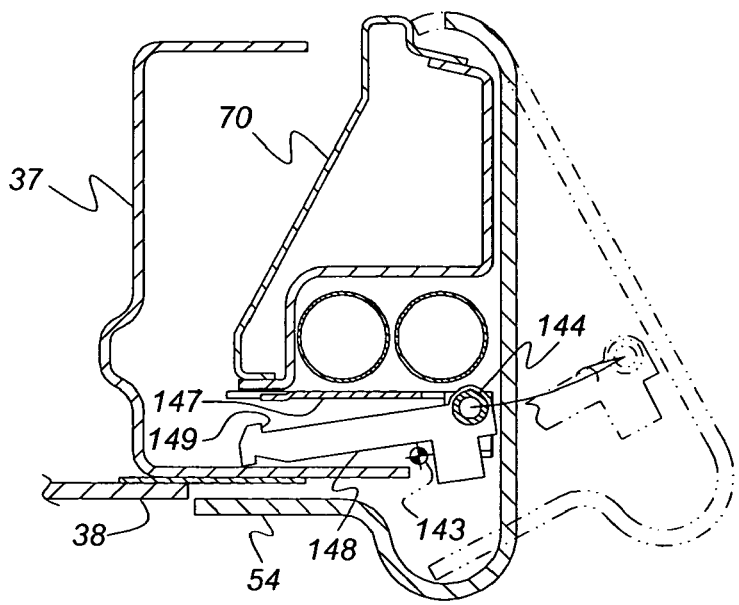
FIG. 10 is a sectional view similar to FIG. 9, but illustrating the disengagement of the gravity latch assembly when the supplemental tailgate is in a generally horizontal orientation.

Thus, to deploy the supplemental tailgate 20 from its stowed position, one actuates the release handle 35 (thereby actuating the generally conventional release mechanism) and moves the tailgate 20 to its generally horizontal, open position, (as can be seen in FIG. 3). In this position, gravity will cause the longitudinal arm 148 to move to the unlocked position, as best seen in FIG. 10. The catch 149 is now spaced from the catch plate 147. Now, when one grasps the pivotable molding 54 and pivots it relative to the pivot axis 77 (to the position shown in phantom in FIG. 10), the release flanges 90 will pull up on the latch actuation rods 80, which, in turn, will pull up on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

One then pulls on the supplemental tailgate 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20, the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58, (best seen in FIG. 4). Also, at these extended positions, the support tubes 62 still remain partially within the guide rails 58 so that the two will not pivot relative to one another. With the tailgate 20 in its horizontal open position, the supplemental tailgate 22 is now in its bed extender position. While only a limited number of bed extender positions are discussed herein, the supplemental tailgate 22 may have additional bed extender positions by providing additional engagement slots, if so desired.

The pivotable molding 54 can then be pivoted again to release the latching assemblies 60 once more. One may then pull the supplemental tailgate 22 out to its fully extended position relative to the open tailgate 20. In this fully extended position, the support tubes 62 will be pulled out of the guide rails 58, with the hinge pins 66 engaged in the slots 65 of the pivot brackets 64. The supplemental tailgate 22 may then be pivoted upward into a box extender position (not shown), or downward into a step assist position (not shown).

Figure 5:
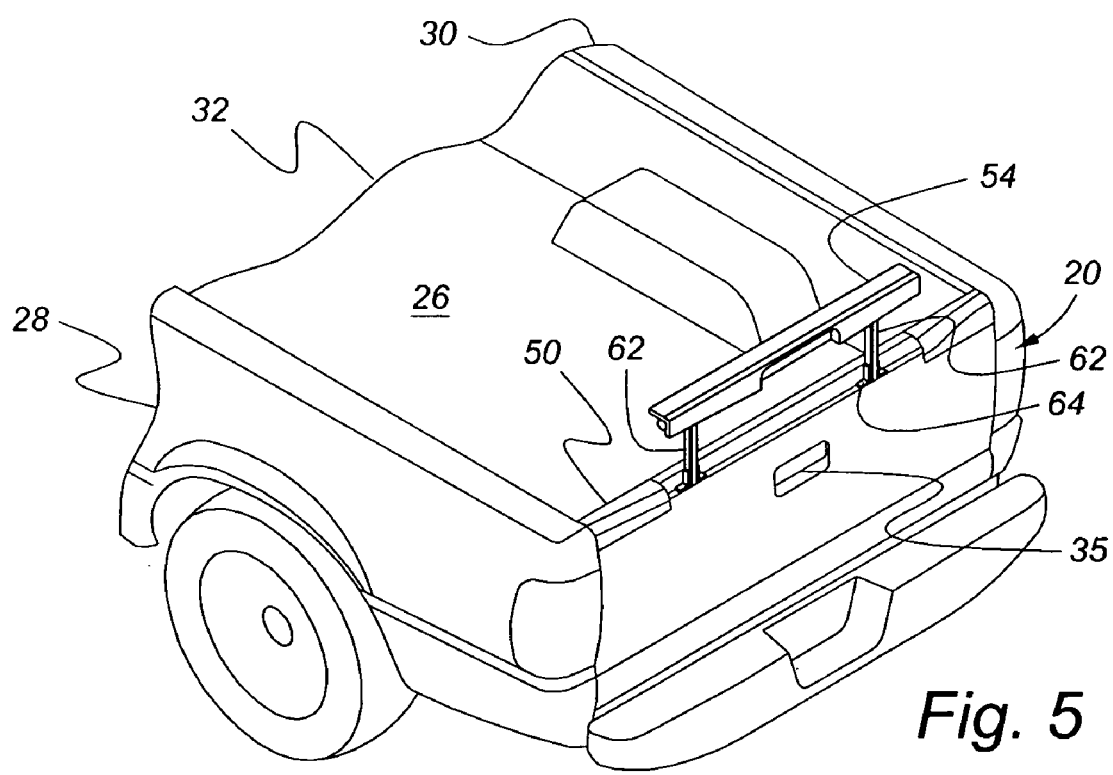
FIG. 5 is a partial perspective view similar to FIG. 1, but with the supplemental tailgate shown in a partially extended position.
Figure 6:
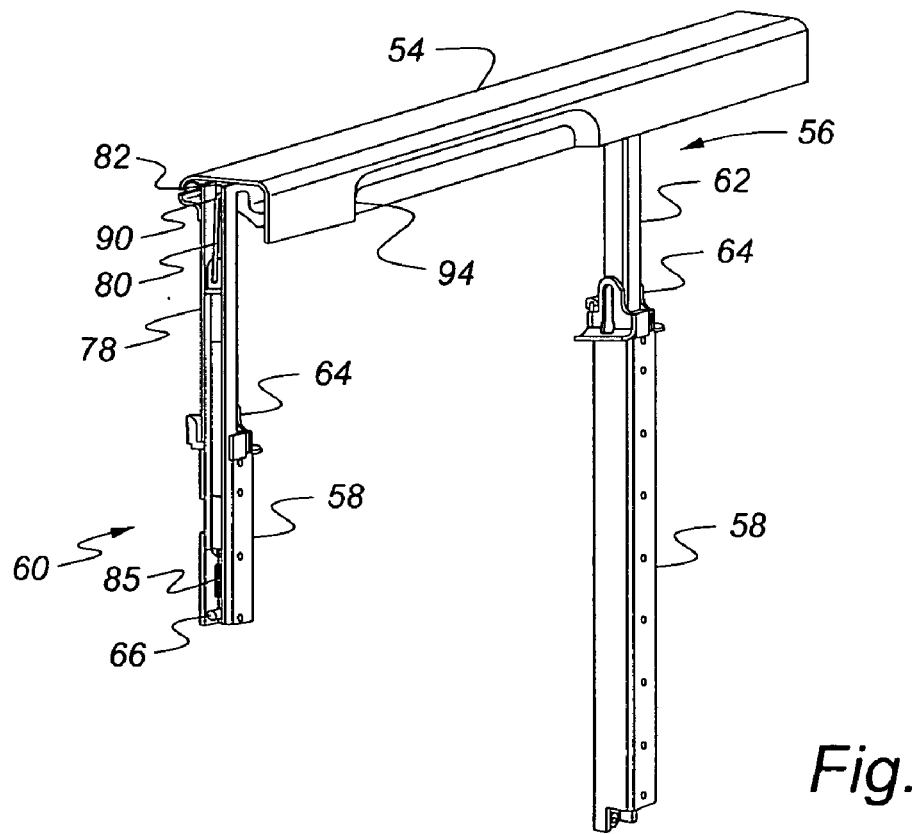
FIG. 6 is a perspective, partially sectioned view of the supplemental tailgate in accordance with the present invention.
Figure 9:
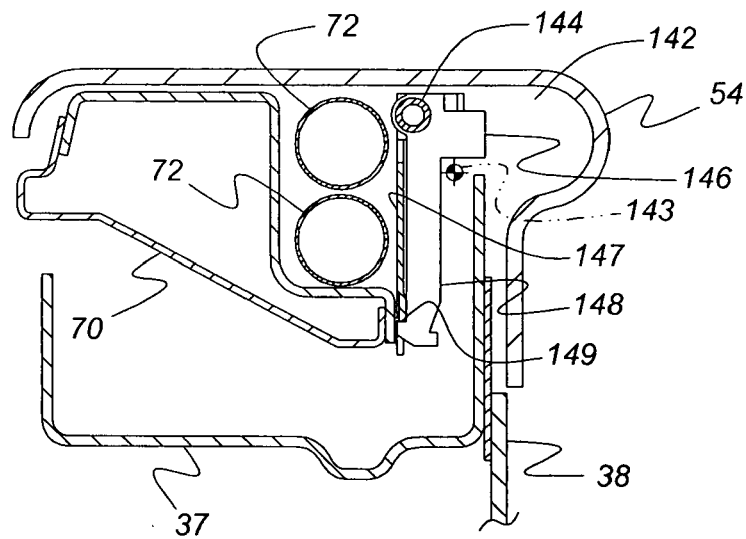
FIG. 9 is a sectional view taken along line 9—9 in FIG. 8.
Figure 11:
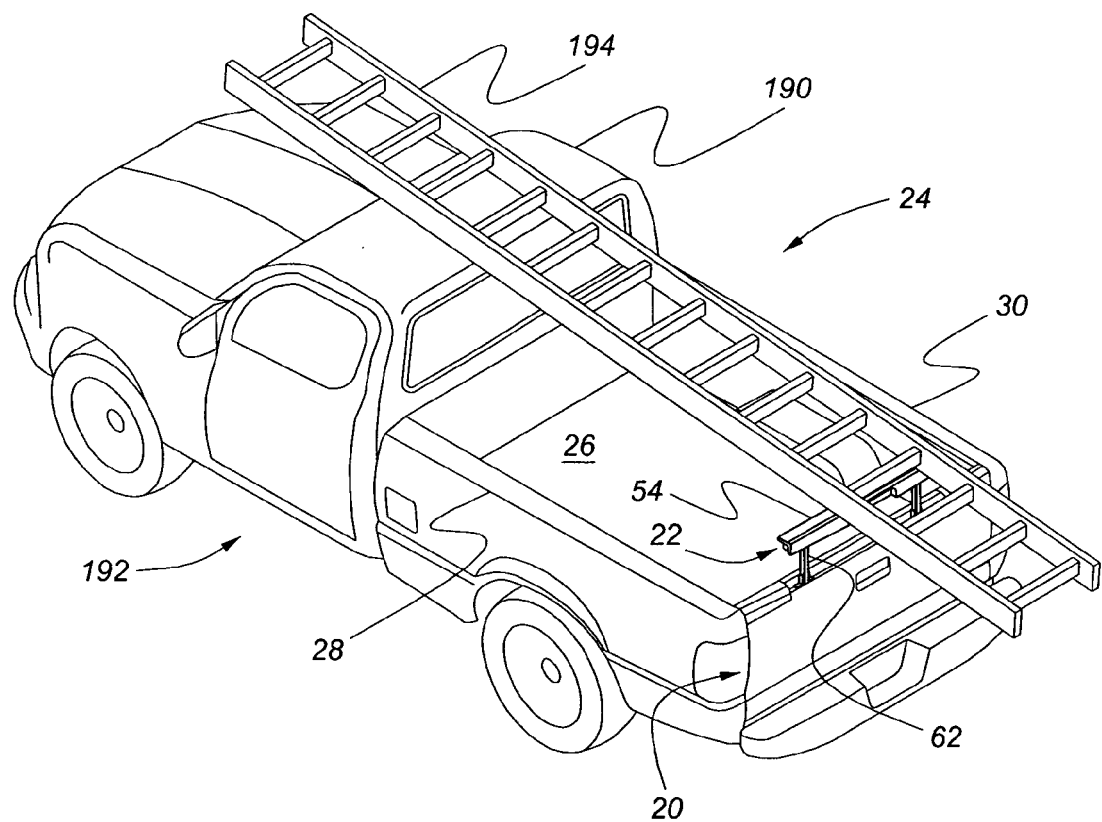
FIG. 11 is a perspective view of the vehicle, with the supplemental tailgate and vehicle tailgate in the position of FIG. 5, illustrating the supplemental tailgate supporting a ladder, in accordance with the present invention.
Figure 12:
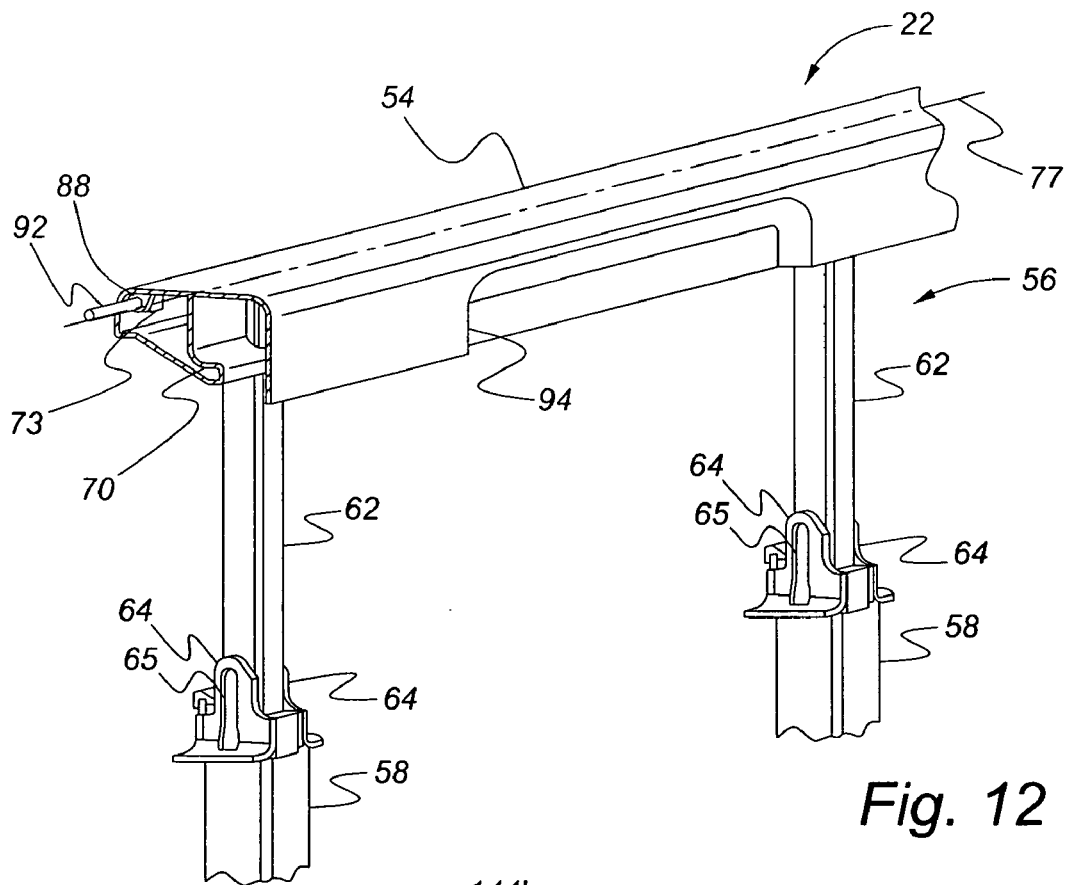
FIG. 12 illustrates a perspective, partially sectioned view of the supplemental tailgate similar to FIG. 6, but with the section cut taken at a different location.

On the other hand, rather than fully extending the supplemental tailgate 22, one can leave it in the partially extended position and close the tailgate 20, as best seen in FIG. 5. In this position, the gravity latch assembly 142 will now move back into the locked position, as shown in FIGS. 8 and 9. Now, the pivotable molding 54 cannot be inadvertently pivoted, thereby preventing the latching assemblies 60 from being unlatched. The supplemental tailgate 22 is now in a roof rack type of position. That is, a long item, such as a ladder 194 for example, can have a first end that is mounted on the roof 190 of a pickup cab 192 and a second end that is mounted on the supplemental tailgate 22, as best seen in FIG. 11. Other long items, that is, items with a length sufficient to extend between the roof 190 and the supplemental tailgate 22, may also be carried in this same way. With the gravity latch assembly 142 preventing the pivotable molding 54 from pivoting, one can load and unload the ladder 194 without concern that the latching assemblies 60 will become unlatched, thus preventing the supplemental tailgate 22 from dropping into the tailgate 20.

Performing the deployment operations generally in reverse will allow one to easily stow and latch the supplemental tailgate 22 back into the tailgate 20. Hence, an easy to operate and ergonomic supplemental tailgate 22 is provided for the vehicle 24.

Figure 13:
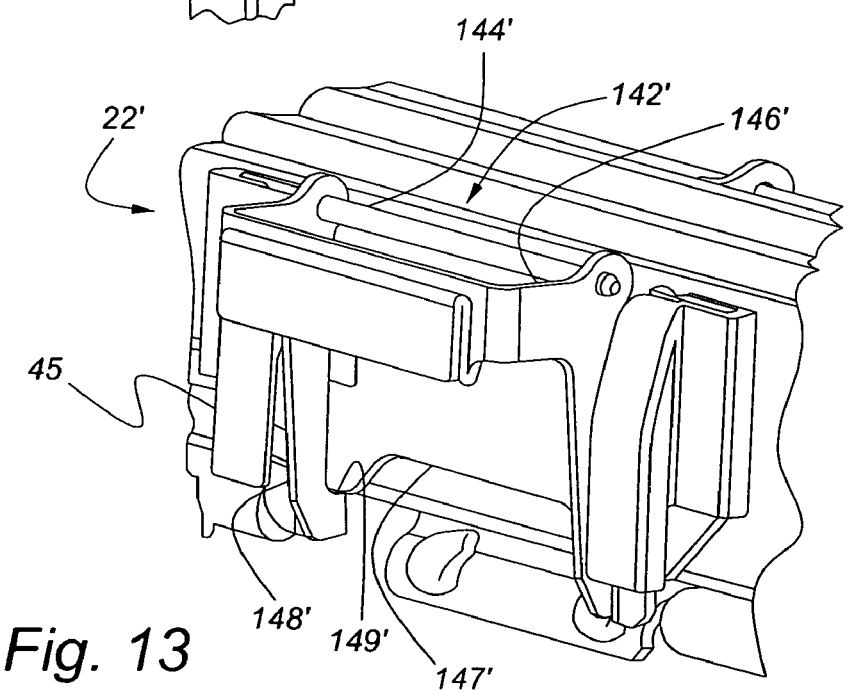
FIG. 13 is a perspective view of a portion of the supplemental tailgate according to a second embodiment of the present invention.

FIG. 13 illustrates a second embodiment of the present invention. In this embodiment, the gravity latch assembly 142' includes a gravity lock cover 45 that mounts about a portion of each longitudinal arm 148'. The gravity lock cover 45 still allows the lateral arms 146' and longitudinal arms 148' to pivot about the pivot pin 144'-based on the orientation of the supplemental tailgate 22' relative to the pull of gravity-enough for the catch 149' to engage and disengage from the catch plate 147'. But the gravity lock cover 45 will limit the travel of the longitudinal arms 148' enough to prevent them from contacting the tailgate frame (not shown in this embodiment). This may limit the potential for the longitudinal arms 148' to scratch or interfere with the operation of other components.

While certain example embodiments of the present invention have been described in detail, those familiar with the art to which this invention relates will recognize various alternative designs and embodiments for practicing the invention as defined by the following claims.

What is claimed is:

1. A tailgate assembly for use with a motor vehicle having a pair of spaced, generally vertical side walls and a generally horizontal bed extending therebetween, the tailgate assembly comprising:
    a tailgate frame defining a generally hollow cavity therein and adapted to pivotally mount generally between the side walls and being operable between a generally horizontal open position and a generally vertical closed position; and
    a supplemental tailgate including a guide system secured generally within the hollow cavity, a movable frame assembly having two telescoping supports extendable from and retained by the guide system, a cross member connected to the two telescoping supports and extending therebetween, a pivotable latch release lever mounted on and pivotable relative to the cross member, a latch release assembly operatively connected to the pivotable latch release lever and operable to selectively release the two telescoping supports from the guide system, and a gravity latch assembly operatively engaging the pivotable latch release lever to prevent the pivotable latch release lever from being actuated when the tailgate frame is in the generally vertical closed position.

2. The tailgate assembly of claim 1 wherein the gravity latch assembly also operatively engages the pivotable latch release lever to allow the pivotable latch release lever to be actuated when the tailgate frame is in the generally horizontal open position.

3. The tailgate assembly of claim 2 wherein the gravity latch assembly includes a pivot pin mounted to the cross member, a lateral arm extending from the pivot pin, and a longitudinal arm that is longer than the lateral arm and extends from the pivot pin in a direction substantially normal to the lateral arm, and wherein the lateral arm and the longitudinal arm define a center of gravity that is spaced from the pivot pin.

4. The tailgate assembly of claim 3 wherein the gravity latch assembly includes a catch plate fixedly mounted to the cross member and the longitudinal arm includes a catch extending therefrom that operatively engages the catch plate when the tailgate frame is in the generally vertical closed position.

5. The tailgate assembly of claim 4 wherein the pivotable latch release lever is a pivotable molding that is pivotally mounted to the cross member.

6. The tailgate assembly of claim 1 wherein the pivotable latch release lever is a pivotable molding that is pivotally mounted to the cross member.

7. The tailgate assembly of claim 1 wherein the gravity latch assembly includes a pivot pin mounted to the cross member, a lateral arm extending from the pivot pin, and a longitudinal arm that is longer than the lateral arm and extends from the pivot pin in a direction substantially normal to the lateral arm, and wherein the lateral arm and the longitudinal arm define a center of gravity that is spaced from the pivot pin.

8. The tailgate assembly of claim 7 wherein the gravity latch assembly includes a catch plate fixedly mounted to the cross member and the longitudinal arm includes a catch extending therefrom that operatively engages the catch plate when the tailgate frame is in the generally vertical closed position.

9. The tailgate assembly of claim 1 wherein the gravity latch assembly includes a catch plate fixedly mounted to the cross member and a catch that is engagable with the catch plate when the tailgate frame is in the generally vertical closed position and is disengagable from the catch plate when the tailgate frame is in the generally horizontal open position.

10. The tailgate assembly of claim 1 wherein the guide system includes two hollow guide tubes, with each of the telescoping supports mounted in and selectively telescopically movable relative to a respective one of the guide tubes.

11. The tailgate assembly of claim 10 further including two pivot brackets, each having a pivot slot, with one of each of the pivot brackets mounted on a respective one of the guide tubes; and two pivot pins, one each secured to a respective one of the telescoping supports, whereby when the telescoping supports are essentially fully removed from the guide tubes, the pivot pins will engage with the pivot slots to secure each telescoping support to the respective guide tube while allowing the telescoping supports to pivot relative to the guide tubes.

12. A truck comprising:
a box having a pair of spaced generally vertical side walls and a generally horizontal bed extending therebetween, and a cab having a roof enclosing a top portion of the cab;
a tailgate having a tailgate frame defining a generally hollow cavity therein and pivotally mounted generally between the side walls and operable between a generally horizontal open position and a generally vertical closed position; and
a supplemental tailgate including a guide system secured generally within the hollow cavity, a movable frame assembly having two telescoping supports extendable from and retained by the guide system, a cross member connected to the two telescoping supports and extending therebetween, a latch release lever, a latch release assembly operatively connected to the latch release lever and operable to selectively release the two telescoping supports from the guide system, and a catch assembly operatively engaging the latch release lever to prevent the latch release lever from being actuated when the tailgate frame is in the generally vertical closed position and allow the latch release lever to be actuable when the tailgate frame is in the generally horizontal open position.

13. The truck of claim 12 wherein the latch release lever is a pivotable molding mounted on and pivotable relative to the cross member.

14. The truck of claim 12 wherein the catch assembly includes a catch position associated with the tailgate frame being in a generally vertical closed position and a non-catch position associated with the tailgate frame being in a generally horizontal open position, and wherein the catch assembly is movable between the catch position and the non-catch position due to a gravitational force.

15. The truck of claim 12 wherein the catch assembly is a gravity catch assembly and includes a pivot pin mounted to the cross member, a lateral arm extending from the pivot pin, and a longitudinal arm that is longer than the lateral arm and extends from the pivot pin in a direction substantially normal to the lateral arm, and wherein the lateral arm and the longitudinal arm define a center of gravity that is spaced from the pivot pin.

16. The truck of claim 15 wherein the gravity catch assembly includes a catch plate fixedly mounted on the cross member and the longitudinal arm includes a catch extending therefrom that operatively engages the catch plate when the tailgate frame is in the generally vertical closed position.

17. The truck of claim 12 wherein the catch assembly is a gravity catch assembly and includes a catch plate fixedly mounted to the cross member and a catch that is engagable with the catch plate when the tailgate frame is in the generally vertical closed position and is disengagable from the catch plate when the tailgate frame is in the generally horizontal open position.

18. The truck of claim 12 wherein the guide system includes two hollow guide tubes, with each of the telescoping supports mounted in and selectively telescopically movable relative to a respective one of the guide tubes.

19. The truck of claim 18 further including two pivot brackets, each having a pivot slot, with one of each of the pivot brackets mounted on a respective one of the guide tubes; and two pivot pins, one each secured to a respective one of the telescoping supports, whereby when the telescoping supports are essentially fully removed from the guide tubes, the pivot pins will engage with the pivot slots to secure each telescoping support to the respective guide tube while allowing the telescoping supports to pivot relative to the guide tubes.

20. The truck of claim 12 wherein when the telescoping supports are extended from the guide system and the tailgate is in its generally vertical closed position, the supplemental tailgate cooperates with the roof of the cab to provide support for long items carried thereon.

21. A tailgate assembly for use with a motor vehicle having a pair of spaced, generally vertical side walls and a generally horizontal bed extending therebetween, the tailgate assembly comprising:
a tailgate frame defining a generally hollow cavity therein and adapted to pivotally mount generally between the side walls and being operable between a generally horizontal open position and a generally vertical closed position; and a supplemental tailgate including a guide system secured generally within the hollow cavity, a movable frame assembly having two telescoping supports extendable from and retained by the guide system, a cross member connected to the two telescoping supports and extending therebetween, a latch release lever, a latch release assembly operatively connected to the latch release lever and operable to selectively release the two telescoping supports from the guide system, and a catch assembly, having a catch plate fixedly mounted to the cross member and a catch that is engagable with the catch plate when the tailgate frame is in the generally vertical closed position and is disengagable from the catch plate when the tailgate frame is in the generally horizontal open position, the catch assembly operatively engaging the latch release lever to prevent the latch release lever from being actuated when the tailgate frame is in the generally vertical closed position.

* * * * *

UNITED STATES PATENT AND TRADEMARK OFFICE
CERTIFICATE OF CORRECTION

PATENT NO. : 6,935,671 B2  
APPLICATION NO. : 10/970283  
DATED : August 30, 2005  
INVENTOR(S) : Bruford et al.

It is certified that error appears in the above-identified patent and that said Letters Patent is hereby corrected as shown below:

On the title page item (73) should read: Assignees: Ford Global Technologies LLC, Dearborn, MI (US); Multimatic Inc., Markham (CA)

Signed and Sealed this

Fourth Day of March, 2008

JON W. DUDAS  
*Director of the United States Patent and Trademark Office*